US012592352B2

(12) United States Patent
Khan et al.

(10) Patent No.: US 12,592,352 B2
(45) Date of Patent: *Mar. 31, 2026

(54) CONTROL CIRCUIT FOR AUTOMATIC DEACTIVATION OF ENERGY REDUCING MAINTENANCE SWITCH

(71) Applicant: SAUDI ARABIAN OIL COMPANY, Dhahran (SA)

(72) Inventors: Md Abid Khan, Al Khobar (SA); Mohammed Khurmy, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 301 days.

This patent is subject to a terminal disclaimer.

(21) Appl. No.: 18/476,153

(22) Filed: Sep. 27, 2023

(65) Prior Publication Data

US 2025/0104948 A1 Mar. 27, 2025

(51) Int. Cl.

| | |
|---|---|
| ***H01H 47/00*** | (2006.01) |
| ***H01H 47/18*** | (2006.01) |
| ***H01H 47/22*** | (2006.01) |

(52) U.S. Cl.

CPC .......... *H01H 47/22* (2013.01); *H01H 47/002* (2013.01); *H01H 47/18* (2013.01)

(58) Field of Classification Search

CPC ...................................................... H01H 47/22

See application file for complete search history.

(56) References Cited

U.S. PATENT DOCUMENTS

| | | | | |
|---|---|---|---|---|
| 10,475,612 | B2 * | 11/2019 | Zhang ................ | G01R 31/3278 |
| 11,469,591 | B2 | 10/2022 | Castillo | |
| 2010/0265629 | A1 * | 10/2010 | Beckerman ............ | H01H 47/22 361/160 |
| 2016/0225561 | A1 * | 8/2016 | Fukumoto ............. | H01H 47/22 |
| 2023/0097925 | A1 | 3/2023 | Sarkis | |
| 2024/0030695 | A1 | 1/2024 | Khan | |

OTHER PUBLICATIONS

Non-Final Office Action issued by the U.S. Patent Office for corresponding U.S. Appl. No. 18/414,829, mailed Oct. 21, 2025 (7 pages).

* cited by examiner

*Primary Examiner* — Stephen W Jackson

(74) *Attorney, Agent, or Firm* — Osha Bergman Watanabe & Burton LLP

(57) ABSTRACT

An Energy Reducing Maintenance Switch (ERMS) includes: a first switch that is normally open; a coil that is controlled by the first switch; a relay having instantaneous settings; a first normally-open contact that is controlled by the coil; a delay timer; and a second normally-open contact that is controlled by the delay timer. The coil is charged upon closing the first switch. The ERMS closes the first normally-open contact and energizes upon charging the coil. The delay timer starts to count from a first present time to a second preset time upon closing the first normally-open contact. The ERMS closes the second normally-open contact upon the delay timer starting to count. The ERMS activates the instantaneous settings of the relay, by activating an input signal to the relay, upon closing the second normally-open contact. While the delay timer counts from the first preset time to the second preset time, the second normally-open contact is closed.

18 Claims, 6 Drawing Sheets

CONTROL CIRCUIT FOR AUTOMATIC DEACTIVATION OF ENERGY REDUCING MAINTENANCE SWITCH

BACKGROUND

Energy Reduction Maintenance Switches (ERMS) are commonly used in upstream high voltage switchgears that may include high voltage circuit breakers and transformers. When an ERMS that is connected to a high voltage breaker is activated, it reduces the Arc Flash energy level on the bus of the circuit breaker. For example, the ERMS reduces the Arc Flash energy level on a line side of a 480 Volt (V) circuit breaker and on a connection point of a secondary side of a 480 V transformer. When the ERMS is "ON" (i.e., is activated) prior to and while performing maintenance activities on the transformer or circuit breaker, the ERMS provides protection for a fault in the transformer or circuit breaker by lowering an Arc Flash incident energy on the bus of the switchgear by activating instantaneous settings in the protection relay. After the maintenance activities are completed, the ERMS is switched back to "OFF" position (i.e., will be deactivated) to adjust back the protection settings of the switchgear.

A conventional ERMS requires human intervention prior to and after the maintenance activities and therefore it may be subjected to human errors. In addition, the conventional ERMS may be installed in remote upstream high voltage switchgears, which may not be easily accessible to monitor from a maintenance location. Therefore, any human error that occurs on the conventional ERMS may be difficult to be diagnosed and resolved. For example, if a maintenance operator forgets to deactivate the ERMS after the maintenance has been performed, leaving the activated ERMS in the switchgear may compromise protection of the switchgear.

SUMMARY

This summary is provided to introduce a selection of concepts that are further described below in the detailed description. This summary is not intended to identify key or essential features of the claimed subject matter, nor it is intended to be used as an aid in limiting the scope of the claimed subject matter.

This disclosure presents, in accordance with one or more embodiments, an Energy Reducing Maintenance Switch (ERMS). The ERMS includes: a first switch that is normally open; a coil that is controlled by the first switch; a relay having instantaneous settings; a first normally-open contact that is controlled by the coil; a delay timer; and a second normally-open contact that is controlled by the delay timer. The coil is charged upon closing the first switch. The ERMS closes the first normally-open contact and energizes upon charging the coil. The delay timer starts to count from a first present time to a second preset time upon closing the first normally-open contact. The ERMS closes the second normally-open contact upon the delay timer starting to count. The ERMS activates the instantaneous settings of the relay, by activating an input signal to the relay, upon closing the second normally-open contact. While the delay timer counts from the first preset time to the second preset time, the second normally-open contact is closed.

In another aspect, this disclosure presents, in accordance with one or more embodiments, a method for operating an ERMS. The method comprises: charging a coil of the ERMS by closing a first switch of the ERMS, wherein the first switch is normally open; closing a first normally-open contact of the ERMS and energizing the ERMS by charging the coil; starting a delay timer of the ERMS, to count from a first present time to a second preset time, when the first normally-open contact is closed; closing a second normally-open contact of the ERMS upon starting the delay timer to count; activating instantaneous settings of a relay of the ERMS, by activating an input signal to the relay, upon closing the second normally-open contact; and while the delay timer counts from the first preset time to the second preset time, keeping the second normally-open contact of the ERMS closed.

In another aspect, this disclosure presents, in accordance with one or more embodiments, a non-transitory computer readable medium (CRM) storing instructions for performing an operation on an ERMS. The operation comprises: charging a coil of the ERMS by closing a first switch of the ERMS, wherein the first switch is normally open; closing a first normally-open contact of the ERMS and energizing the ERMS by charging the coil; starting a delay timer of the ERMS, to count from a first present time to a second preset time, when the first normally-open contact is closed; activating the instantaneous settings of a relay of the ERMS, by activating an input signal to the relay, when the delay timer starts to count; closing a second normally-open contact of the ERMS upon starting the delay timer to count; and while the delay timer counts from the first preset time to the second preset time, keeping the second normally-open contact of the ERMS closed.

Other aspects and advantages of the invention will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the disclosure, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, throughout the disclosure, "or" is interpreted as "and/or," unless stated otherwise.

Embodiments disclosed herein describe an Energy Reducing Maintenance Switch (ERMS) that can reduce human error during operation of the ERMS, for example after performing maintenance on a high voltage switchgear that is in connection with the ERMS. After the maintenance activities are completed, the ERMS must be deactivated to adjust back the protection settings of the switchgear from incidents such as a fault, short circuit, high load, or ripples in the switchgear. Therefore, leaving the ERMS active (ON) after the maintenance is completed may compromise protection of the switchgear. In some cases where the switchgear is installed in a remote area, if a conventional ERMS is left active in connection with the switchgear, it may take long until an operator identifies the active ERMS and deactivates it. Accordingly, with respect to a switchgear in a remote area, leaving a conventional ERMS active may increase the possibility of damaging the switchgear. One or more embodiments disclosed herein describe an ERMS and methods and systems to automatically deactivate an ERMS via a delay timer after a preset time period is past even if an operator has inadvertently left the ERMS active in connection with the switchgear.

Figure 1:
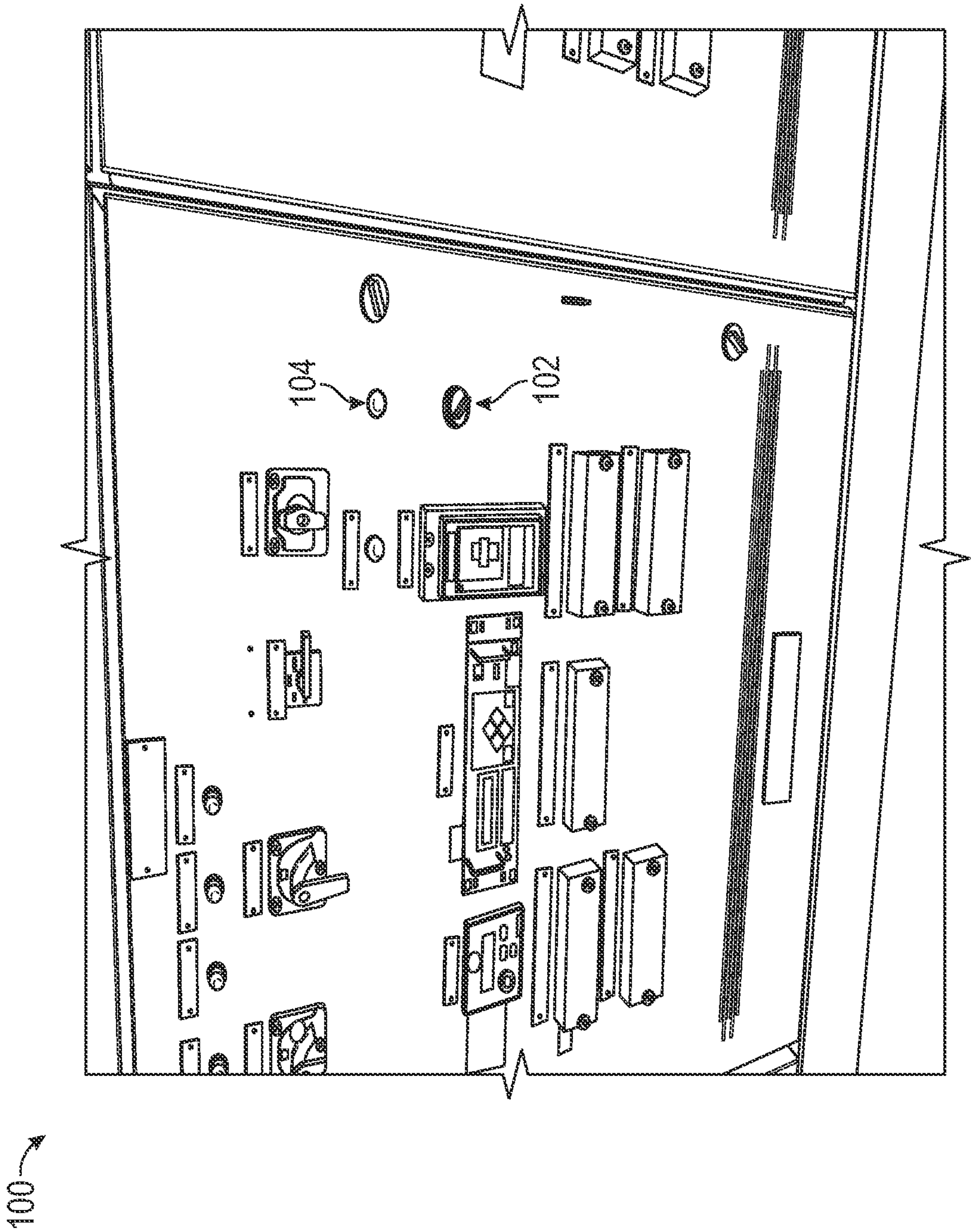
FIG. 1 shows a front panel of a conventional Energy Reducing Maintenance Switch (ERMS).

A conventional ERMS is usually installed on the front panel of a switchgear, as shown in FIG. 1. Specifically, FIG. 1 shows a front panel of a switchgear that includes a switch (102) of the conventional ERMS and a light indicator (104) of the conventional ERMS. The switch (102) may be a select switch or any other type of toggle switch. The switch (102) is normally open when the conventional ERMS is not active. When an operator needs to perform maintenance on the switchgear, the operator toggles the switch (102) to ON (i.e., closes the normally open switch) to activate the conventional ERMS. When the switch (102) is ON and the conventional ERMS is activated, the light indicator (104) turns ON. After the maintenance is completed, the operator must toggle the switch (102) to OFF to deactivate the conventional ERMS. Toggling the switch (102) to OFF also turns OFF the light indicator (104). Otherwise, the conventional ERMS will stay active in connection with the switchgear and may compromise protection of the switchgear.

Figure 2:
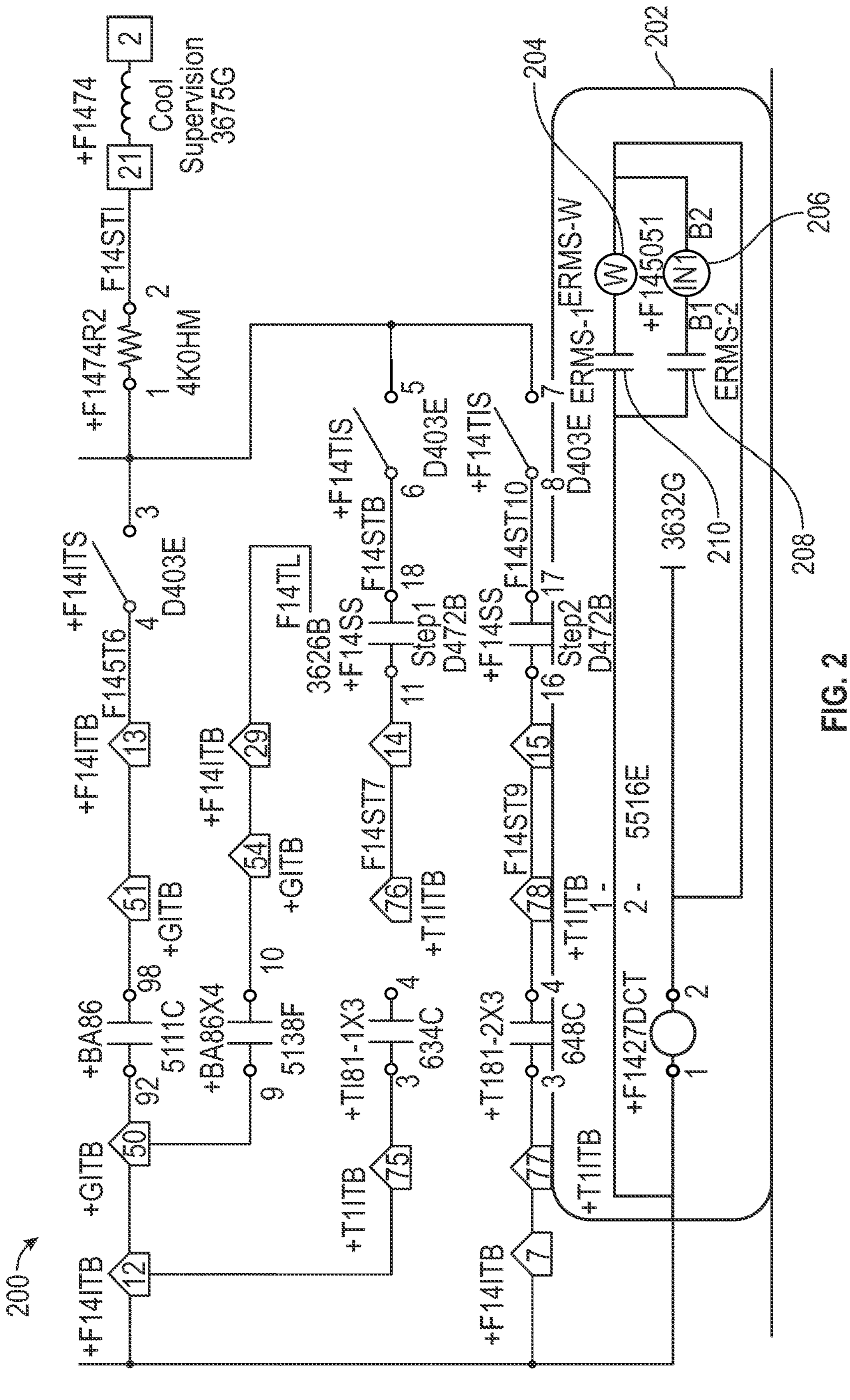
FIG. 2 shows a circuit diagram of a conventional ERMS in connection with a switchgear.

A circuit diagram of a conventional ERMS (202) in connection with a switchgear (200) is shown in FIG. 2. Upon activating the conventional ERMS via a switch, the ERMS-1 normally-open contact (210) will close and provide power to the ERMS-W light indicator (204), an example of which is shown in FIG. 1. At the same time, the ERMS-2 normally-open contact (208) will close and provide signal to the relay IN1 (206) to activate the instantaneous settings of the relay (206). With instantaneous settings, the relay operates as soon as the current becomes higher than a preset value. There is no intentional time delay set which reduce the Arc Flash energy level with compromising the protection coordination with the downstream electrical system.

Figure 3:
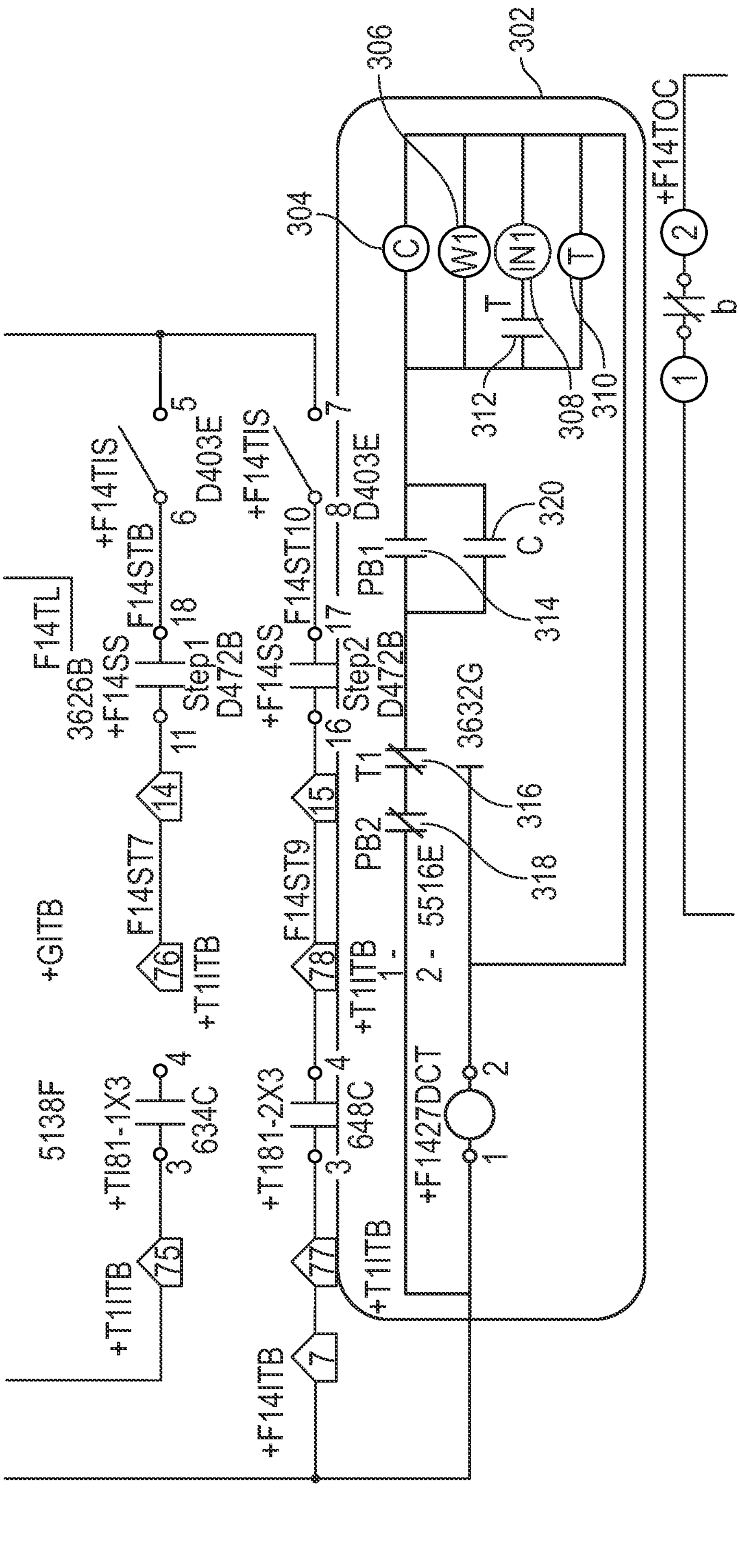
FIG. 3 shows a circuit diagram of an ERMS, in accordance with one or more embodiments disclosed herein, in connection with a switchgear.

According to the embodiments disclosed herein, a delay timer is used in an ERMS to insure that the ERMS will be automatically deactivated after a preset time period is past, even if the ERMS was not manually deactivated. FIG. 3 shows a circuit diagram of an ERMS (302) in accordance with one or more embodiments disclosed herein. The ERMS (302) includes a first switch (314) that is normally open, a coil (304) that is controlled by the first switch (314), a first normally-open contact (320) that is controlled by the coil (304), a light indicator (306), a second normally-open contact (312), a delay timer (310), an input signal to the relay (308) to turn ON instantaneous settings of the relay, a normally-closed contact (316), and a second switch (318) that is normally closed. The second switch (318) may be, for example, a push button based on a specific design or function of the ERMS. The first and second normally-open contacts (320, 312) are contacts that are normally open unless they are closed by another component or an operator. Similarly, the normally-closed contact (316) is a contact that is normally closed unless it is opened by another component or an operator.

According to one or more embodiments, when the first switch (314) is pressed, the coil (304) will be charged (i.e., energized/activated). The coil may be an electromagnetic coil that controls closing or opening circuit breaker contacts (e.g., the first normally-open contact (320)). For example, for closing the contacts of the circuit breaker and connecting the circuit, the coil is charged. The charged coil creates a magnetic field around the coil that attracts the moving parts of the circuit breaker mechanism, aiding in the closing of the contacts.

The charged coil (304) will close the first normally-open contact (320). Upon closing the first normally-open contact (320), the ERMS will be energized and the light indicator (306) will turn ON, which shows that the ERMS is activated. In addition, upon closing the first normally-open contact (320), the delay timer (310) will start counting from a first preset time to a second preset time. As the delay timer (310) starts to count, the second normally-open contact (312) will be closed instantaneously and the input signal will activate the instantaneous settings in the relay (308). When the delay timer (310) reaches the second preset time, the delay timer (310) will stop and the normally-closed contact (316) will be opened to deactivate the whole circuit. The deactivation of the circuit via the normally-closed contact (316) leads to turning OFF the light indicator (306) and deactivation of the input signal to the instantaneous settings of the relay (308). Herein, the time period between the first preset time and the second preset time is called the "preset time period."

In one or more embodiments, The instantaneous settings of the relay (308) can be deactivated or by pressing the second switch (318), which is normally closed, to open the second switch (318). For example, if the operator finishes the work on the switchgear before the delay timer (310) reaches the second preset time, the operator can press and open the second switch (318) to deactivate the instantaneous settings of the relay (308). Opening the closed second switch (318) opens the ERMS circuit, de-energizes whole ERMS circuit and also deactivates the input signal to the relay (308) to deactivate the instantaneous settings of the relay.

In one or more embodiments, the delay timer (310) may count down the preset time period and when the delay timer (310) finishes the preset time period and stops, then the normally-closed contact (316) will be opened. Opening the normally-closed contact (316) opens the circuit of the ERMS, opens the second normally-open contact (312), and deactivates the input signal to the relay (308) to turn off instantaneous settings.

In one or more embodiments, the instantaneous settings of the relay will be deactivated when the delay timer (310) reaches the second preset time, when the timer stops counting or when the second switch (318) is opened, whichever occurs first. When the delay timer (310) stops counting or when the second switch (318) is opened, the ERMS deactivates the input signal to the relay (308) and thereby deactivates the instantaneous settings of the relay.

In view of the above, an operator does not need to deactivate the ERMS since the delay timer (310) will automatically deactivate the instantaneous settings of the relay when the preset time period is past. In addition, the operator can de-energize the ERMS circuit by pressing second switch (318) when the maintenance activities are completed before the preset time of the delay timer (310) runs out.

Figure 4:
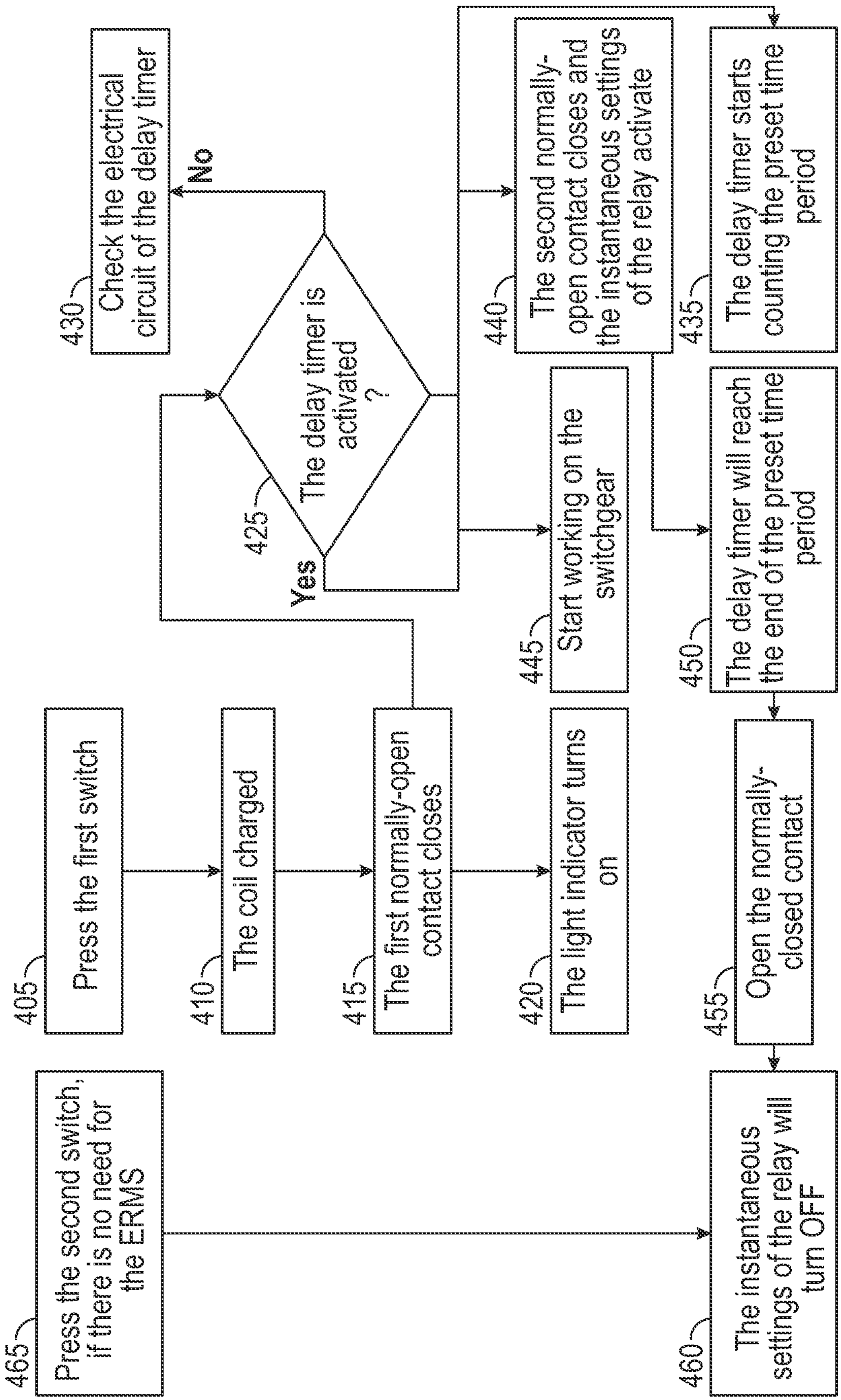
FIG. 4 shows a flow chart for operation of the ERMS shown in FIG. 3, in accordance with one or more embodiments disclosed herein.

FIG. 4 shows a flow chart for operation of the ERMS (302) shown in FIG. 3. First the first switch (314) is pressed in Step 405 to charge the coil (304) in Step 410. The charged coil (304) closes the first normally-open contact (320) in Step 415. When the first normally-open contact (320) closes, the light indicator (308) turns ON in Step 420. Also, closing the first normally-open contact (320) activates the delay timer (310) to start counting in Step 425. If the delay timer (310) is not activated in Step 425, the electrical circuit of the delay timer (310) must be checked in Step 430 to verify proper functionality of the delay timer (310). If the delay timer (310) is activated in Step 425, then the delay timer (310) starts counting the preset time period, which is the maximum time duration during which the instantaneous settings of the relay is activated, in Step 435. When the delay timer (310) is activated, the second normally-open contact (312) closes and the instantaneous settings of the relay (308) activate in Step 440. Upon activation of the instantaneous settings of the relay, the operator can start working on the switchgear in Step 445. When the delay timer (310) reaches the end of the preset time period (i.e., reaches the second preset time) in Step 450, the normally-closed contact (316) will be opened in Step 455. Upon opening the normally-closed contact (316), the instantaneous settings of the relay will turn OFF (i.e., the ERMS will be deactivated) in Step 460. In Step 465, if the operator finishes working on the switchgear before the preset time period ends, the operator can press the second switch (318) to deactivate the instantaneous settings of the relay.

In one or more embodiments, any of Steps 405-425, 435, and 440 may occur instantaneously or simultaneously with one another such that the time delays between any of these steps may be negligible in view of the operator. In addition, any of Steps 450, 455, and 460 may also occur instantaneously or simultaneously with one another such that the time delays between any of these steps may be negligible in view of the operator. Further, Steps 465 and 460 may also occur instantaneously or simultaneously with one another such that the time delay between these steps may be negligible in view of the operator.

Figure 5:
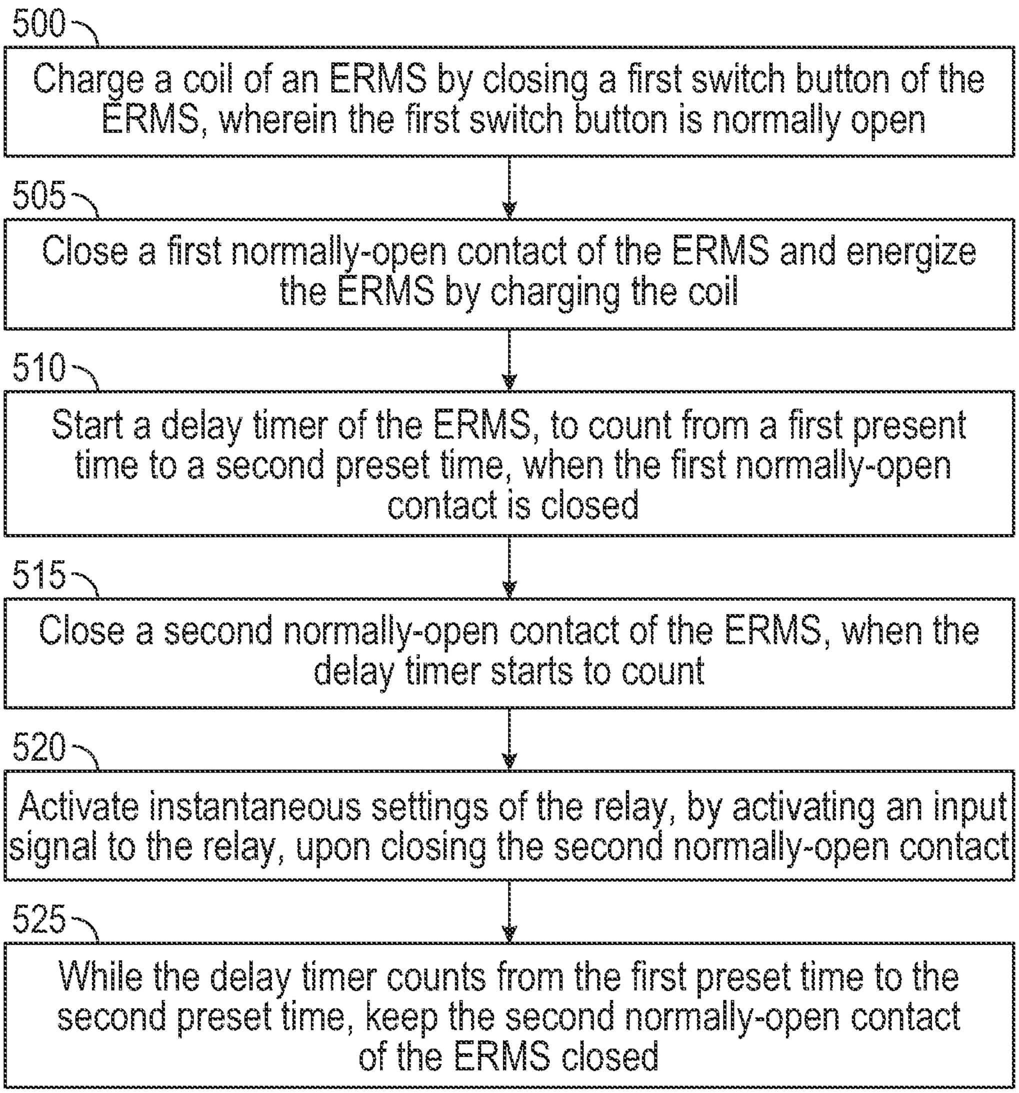
FIG. 5 shows a method for operating an ERMS, in accordance with one or more embodiments disclosed herein.

FIG. 5 shows a flowchart for operating an ERMS, in accordance with one or more embodiments. In one or more embodiments, one or more of the steps shown in FIG. 5 may be omitted, repeated, and/or performed in a different order than the order shown in FIG. 5. Accordingly, the scope of the invention should not be considered limited to the specific arrangement of the steps shown in FIG. 5. The steps shown in FIG. 5 are explained below.

In Step 500, a coil of an ERMS is charged by closing a first switch of the ERMS, wherein the first switch is normally open.

In Step 505, a first normally-open contact of the ERMS is closed and the ERMS is energized by charging the coil.

In Step 510, a delay timer of the ERMS starts to count from a first present time to a second preset time, when the first normally-open contact is closed.

In Step 515, a second normally-open contact of the ERMS is closed, when the delay timer starts to count.

In Step 520, instantaneous settings of the relay activate, by activating an input signal to the relay, upon closing the second normally-open contact.

In Step 525, while the delay timer counts from the first preset time to the second preset time, the second normally-open contact of the ERMS is kept closed.

The method may include one or more steps based on the embodiments described above. Some examples of these steps are as follows.

In one or more embodiments, upon the delay timer reaching the second preset time, a normally-closed contact of the ERMS is opened. Opening the normally-closed contact deactivates the instantaneous settings of the relay.

In one or more embodiments, a light indicator of the ERMS is turned ON upon activating the instantaneous settings of the relay and the light indicator is tuned OFF upon deactivating the instantaneous settings of the relay.

In one or more embodiments, a second switch of the ERMS that is normally closed may be opened. Opening the second switch of the ERMS deactivates the instantaneous settings of the relay.

In one or more embodiments, the instantaneous settings of the relay may be active only when the delay timer counts between the first preset time and the second preset time.

In one or more embodiments, the instantaneous settings of the relay may be active only when the second switch of the ERMS is closed, and the second switch is normally closed.

In one or more embodiments, opening the second switch before the delay timer reaching the second preset time deactivates the instantaneous settings of the relay.

Examples of the above steps are described above with reference to FIGS. 3 and 4.

One or more embodiments disclosed herein for operating an ERMS, for example with reference to FIGS. 3-5, may be implemented on virtually any type of computer system, regardless of the platform being used. The computer system may have programs or algorithms to control the functions/operations of the ERMS described in the above embodiments. For example, the computer system may be one or more mobile devices (e.g., laptop computer, smart phone, personal digital assistant, tablet computer, or other mobile device), desktop computers, servers, an automation setup, blades in a server chassis, or any other type of computer system that includes at least the minimum processing power, memory, and input and output device(s) to perform one or more embodiments of the invention.

Figure 6:
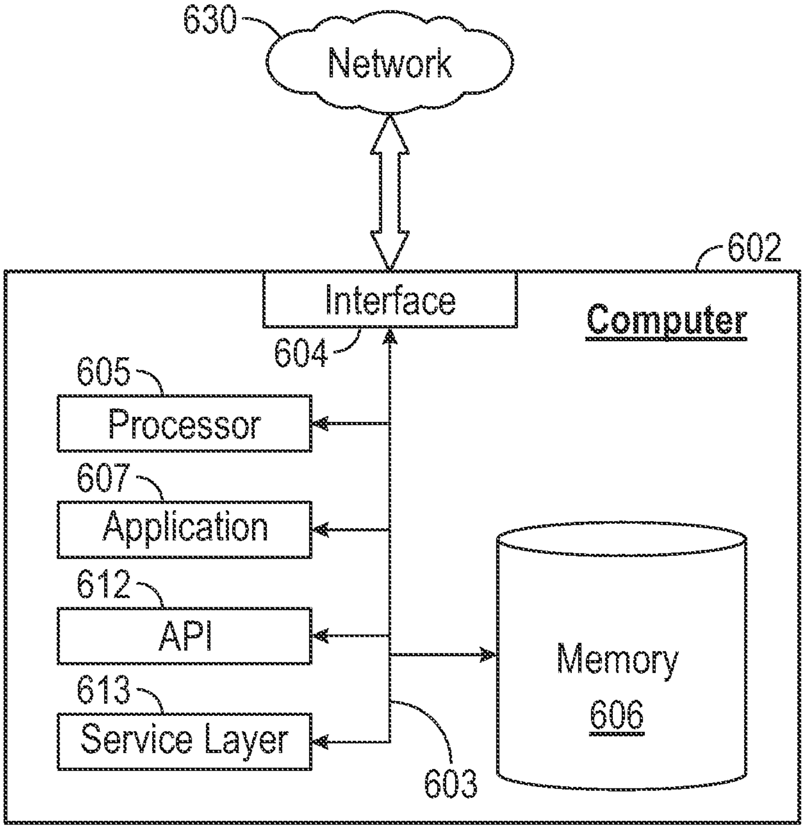
FIG. 6 shows a computer system, in accordance with one or more embodiments disclosed herein.

An example of the computer system is described with reference to FIG. 6, in accordance with one or more embodiments. FIG. 6 is a block diagram of a computer system used to provide computational functionalities associated with described algorithms, methods, functions, processes, flows, and procedures as described in the instant disclosure, according to an implementation. The illustrated computer (602) in the computer system is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (602) may include an input device, such as a keypad, keyboard, touch screen, or other device that can accept user information, and an output device that conveys information associated with the operation of the computer (602), including digital data, visual, or audio information (or a combination of information), or a GUI.

The computer (602) can serve in a role as a client, network component, a server, a database or other persistency, or any other component (or a combination of roles) of a computer system for performing the subject matter described in the instant disclosure. The illustrated computer (602) is communicably coupled with a network (630). In some implementations, one or more components of the computer (602) may be configured to operate within environments, including cloud-computing-based, local, global, or other environment (or a combination of environments).

At a high level, the computer (602) is an electronic computing device operable to receive, transmit, process, store, or manage data and information associated with the described subject matter. According to some implementations, the computer (602) may also include or be communicably coupled with an application server, e-mail server, web server, caching server, streaming data server, business intelligence (BI) server, or other server (or a combination of servers).

The computer (602) can receive requests over network (630) from a client application (for example, executing on another computer (602)) and responding to the received requests by processing the said requests in an appropriate software application. In addition, requests may also be sent to the computer (602) from internal users (for example, from a command console or by other appropriate access method), external or third-parties, other automated applications, as well as any other appropriate entities, individuals, systems, or computers.

Each of the components of the computer (602) can communicate using a system bus (603). In some implementations, any or all of the components of the computer (602), both hardware or software (or a combination of hardware and software), may interface with each other or the interface (604) (or a combination of both) over the system bus (603) using an application programming interface (API) (612) or a service layer (613) (or a combination of the API (612) and service layer (613)). The API (612) may include specifications for routines, data structures, and object classes. The API (612) may be either computer-language independent or dependent and refer to a complete interface, a single function, or even a set of APIs. The service layer (613) provides software services to the computer (602) or other components (whether or not illustrated) that are communicably coupled to the computer (602). The functionality of the computer (602) may be accessible for all service consumers using this service layer (613). Software services, such as those provided by the service layer (613), provide reusable, defined business functionalities through a defined interface. For example, the interface may be software written in JAVA, C++, Python, or other suitable language providing data in extensible markup language (XML) format or another suitable format. While illustrated as an integrated component of the computer (602), alternative implementations may illustrate the API (612) or the service layer (613) as stand-alone components in relation to other components of the computer (602) or other components (whether or not illustrated) that are communicably coupled to the computer (602). Moreover, any or all parts of the API (612) or the service layer (613) may be implemented as child or sub-modules of another software module, enterprise application, or hardware module without departing from the scope of this disclosure.

The computer (602) includes an interface (604). Although illustrated as a single interface (604) in FIG. 6, two or more interfaces (604) may be used according to particular needs, desires, or particular implementations of the computer (602). The interface (604) is used by the computer (602) for communicating with other systems in a distributed environment that are connected to the network (630). Generally, the interface (604) includes logic encoded in software or hardware (or a combination of software and hardware) and operable to communicate with the network (630). More specifically, the interface (604) may include software supporting one or more communication protocols associated with communications such that the network (630) or interface's hardware is operable to communicate physical signals within and outside of the illustrated computer (602).

The computer (602) includes at least one computer processor (605). Although illustrated as a single computer processor (605) in FIG. 6, two or more processors may be used according to particular needs, desires, or particular implementations of the computer (602). Generally, the computer processor (605) executes instructions and manipulates data to perform the operations of the computer (602) and any algorithms, methods, functions, processes, flows, and procedures as described in the instant disclosure.

The computer (602) also includes a memory (606) that holds data for the computer (602) or other components (or a combination of both) that can be connected to the network (630). For example, memory (606) can be a database storing data consistent with this disclosure. In one example, memory (606) may store programs or algorithms for controlling operation of the ERMS that is described in the above embodiments. More specifically, in this example, the programs or algorithms may control operation of the coil, relay, timer, light indicator, normally-open contacts, or normally-closed contact. In one example, the first switch, the second switch, or the light indicator may be shown on a digital display, and the programs and algorithms may control the components of the ERMS based on an operator's action on the first or second switch. Although illustrated as a single memory (606) in FIG. 6, two or more memories may be used according to particular needs, desires, or particular implementations of the computer (602) and the described functionality. While memory (606) is illustrated as an integral component of the computer (602), in alternative implementations, memory (606) can be external to the computer (602).

The application (607) is an algorithmic software engine providing functionality according to particular needs, desires, or particular implementations of the computer (602), particularly with respect to functionality described in this disclosure. For example, the application (607) can serve as one or more components, modules, applications, etc. In one example, the application (607) may include programs or algorithms for controlling operation of the ERMS that is described in the above embodiments. More specifically, in this example, the programs or algorithms may control operation of the coil, relay, timer, light indicator, normally-open contacts, or normally-closed contact. In one example, the first switch, the second switch, or the light indicator may be shown on a digital display, and the programs and algorithms may control the components of the ERMS based on an operator's action on the first or second switch. Further, although illustrated as a single application (607), the application (607) may be implemented as multiple applications (607) on the computer (602). In addition, although illustrated as integral to the computer (602), in alternative implementations, the application (607) can be external to the computer (602). In one example, the method described with reference to FIG. 25 may be implemented by the application (607).

There may be any number of computers (602) associated with, or external to, a computer system containing computer (602), each computer (602) communicating over network (630). Further, the term "client," "user," and other appropriate terminology may be used interchangeably as appropriate without departing from the scope of this disclosure. Moreover, this disclosure contemplates that many users may use one computer (602), or that one user may use multiple computers (602). Furthermore, in one or more embodiments, the computer (602) is a non-transitory computer readable medium (CRM).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. An Energy Reducing Maintenance Switch (ERMS) comprising:
- a first switch that is normally open;
- a coil that is controlled by the first switch;
- a relay having instantaneous settings;
- a first normally-open contact that is controlled by the coil;
- a delay timer; and
- a second normally-open contact that is controlled by the delay timer,
- wherein the coil is charged upon closing the first switch,
- wherein the ERMS closes the first normally-open contact and energizes upon charging the coil,
- wherein the delay timer starts to count from a first present time to a second preset time upon closing the first normally-open contact,
- wherein the ERMS closes the second normally-open contact upon the delay timer starting to count,
- wherein the ERMS activates the instantaneous settings of the relay, by activating an input signal to the relay, upon closing the second normally-open contact, and
- wherein while the delay timer counts from the first preset time to the second preset time, the second normally-open contact is closed.

2. The ERMS of claim 1, wherein
- upon the delay timer reaching the second preset time, the ERMS opens a normally-closed contact, and
- upon opening the normally-closed contact, the ERMS deactivates the instantaneous settings of the relay.

3. The ERMS of claim 1 further comprising a light indicator, wherein
- the ERMS turns on the light indicator upon activating the instantaneous settings of the relay, and
- the ERMS turns off the light indicator upon deactivating the instantaneous settings of the relay.

4. The ERMS of claim 1 further comprising
- a second switch that is normally closed,
- wherein upon opening the second switch, the ERMS deactivates the instantaneous settings of the relay.

5. The ERMS of claim 1, wherein the instantaneous settings of the relay are active only when the delay timer counts between the first preset time and the second preset time.

6. The ERMS of claim 4, wherein the instantaneous settings of the relay are active only when the second switch is closed.

7. The ERMS of claim 4, wherein upon opening the second switch before the delay timer reaches the second preset time, the ERMS deactivates the instantaneous settings of the relay.

8. The ERMS of claim 1, wherein the starting of the delay timer and the activation of the instantaneous settings of the relay occur simultaneously.

9. The ERMS of claim 4, wherein the ERMS deactivates the instantaneous settings of the relay when the delay timer reaches the second preset time or when the second switch is opened, whichever occurs first.

10. A method for operating an Energy Reducing Maintenance Switch (ERMS), the method comprising:
- charging a coil of the ERMS by closing a first switch of the ERMS, wherein the first switch is normally open;
- closing a first normally-open contact of the ERMS and energizing the ERMS by charging the coil;
- starting a delay timer of the ERMS, to count from a first present time to a second preset time, when the first normally-open contact is closed;
- closing a second normally-open contact of the ERMS upon starting the delay timer to count;
- activating instantaneous settings of a relay of the ERMS, by activating an input signal to the relay, upon closing the second normally-open contact; and
- while the delay timer counts from the first preset time to the second preset time, keeping the second normally-open contact of the ERMS closed.

11. The method of claim 10 further comprising
- opening a normally-closed contact of the ERMS when the delay timer reaches the second preset time,
- wherein opening the normally-closed contact of the ERMS deactivates the instantaneous settings of the relay.

12. The method of claim 10 further comprising:
- turning on a light indicator of the ERMS upon activating the instantaneous settings of the relay; and
- turning off the light indicator upon deactivating the instantaneous settings of the relay.

13. The method of claim 10 further comprising
- opening a second switch of the ERMS that is normally closed,
- wherein opening the second switch of the ERMS deactivates the instantaneous settings of the relay.

14. The method of claim 10, wherein the instantaneous settings of the relay are active only when the delay timer counts between the first preset time and the second preset time.

15. The method of claim 10, wherein the instantaneous settings of the relay are active only when a second switch of the ERMS is closed, and the second switch is normally closed.

16. The method of claim 15, wherein opening the second switch before the delay timer reaching the second preset time deactivates the instantaneous settings of the relay.

17. The method of claim 15 further comprising deactivating the instantaneous settings of the relay when the delay timer reaches the second preset time or when the second switch is opened, whichever occurs first.

18. A non-transitory computer readable medium (CRM) storing instructions for performing an operation on an Energy Reducing Maintenance Switch (ERMS), the operation comprising:

charging a coil of the ERMS by closing a first switch of the ERMS, wherein the first switch is normally open;

closing a first normally-open contact of the ERMS and energizing the ERMS by charging the coil;

starting a delay timer of the ERMS, to count from a first present time to a second preset time, when the first normally-open contact is closed;

activating the instantaneous settings of a relay of the ERMS, by activating an input signal to the relay, when the delay timer starts to count;

closing a second normally-open contact of the ERMS upon starting the delay timer to count; and while the delay timer counts from the first preset time to the second preset time, keeping the second normally-open contact of the ERMS closed.

* * * * *